United States Patent [19]
Bonfilio

[11] Patent Number: 6,068,334
[45] Date of Patent: May 30, 2000

[54] MOTORCYCLE STRUCTURE INCORPORATING RUMBLE SEAT AND DIRECTIONAL SIGNAL LIGHTS

[76] Inventor: Paul Bonfilio, 48-53 Glenwood St., Little Neck, N.Y. 11362

[21] Appl. No.: 08/962,651

[22] Filed: Nov. 3, 1997

[51] Int. Cl.[7] .................................. B62J 1/00; B62J 1/28
[52] U.S. Cl. ............................ 297/215.12; 297/195.12; 297/243; 297/215.1; 297/215.11; 180/219
[58] Field of Search ...................... 297/215.12, 195.12, 297/215.1, 215.11, 243; 180/219

[56] References Cited

U.S. PATENT DOCUMENTS

| 3,822,917 | 7/1974 | George | 297/215.12 |
|---|---|---|---|
| 3,873,127 | 3/1975 | McNichol, Jr. et al. | 297/243 X |
| 3,913,974 | 10/1975 | Bowen | 297/215.12 X |
| 4,679,647 | 7/1987 | Komuro | 297/243 X |
| 4,953,911 | 9/1990 | Hanagan | 297/195.12 X |
| 5,544,937 | 8/1996 | Hanagan | 297/215.12 |

*Primary Examiner*—Jose V. Chen
*Assistant Examiner*—Rodney B. White
*Attorney, Agent, or Firm*—Michael Ebert

[57] ABSTRACT

Integrated with the structure of a motorcycle whose engine is supported on a frame between a front wheel turnable by a handlebar and a rear wheel guarded by an aerodynamically-contoured rear fender are a rumble seat and directional front signal lights. The rumble seat which accommodates a passenger is incorporated in a separated section of the fender behind the saddle for seating a driver whose hands grasp the handlebar. The rumble seat is provided with a hinged backrest having a rear section which when the backrest is folded down over the seat then merges with the contours of the fender to conceal the seat. The right and left arms of the handlebar each terminate in a hilt having one branch which functions as a heated handle for a hand of the driver and an adjacent second branch which acts to shield the hand and houses a lamp for a directional signal light.

5 Claims, 2 Drawing Sheets

MOTORCYCLE STRUCTURE INCORPORATING RUMBLE SEAT AND DIRECTIONAL SIGNAL LIGHTS

BACKGROUND OF INVENTION

1. Field of Invention

This invention relates generally to motorcycles, and in particular to a rumble seat and directional front signal lights integrated with the structure of the motorcycle.

2. Status of Prior Art

Gottlieb Daimler, the German inventor, is credited with having in 1885 invented a motorized bicycle which became known as a motorcycle. Early versions of this vehicle were not dependable and the motorcycle did not become popular until well after 1900.

The modern motorcycle is provided with an air-cooled internal combustion engine supported on a metal frame between front and rear wheels, each guarded by a fender. The motor is a two or four cycle gasoline engine with one to four or more cylinders. Motorcycles are widely used for pleasure riding as well as for racing and for the commercial transportation of light loads. They are also used as police vehicles for traffic control and other purposes for which a four-wheeled vehicle is unsuitable.

Included in the structure of a conventional motorcycle is a saddle supported on the frame over the engine, the saddle serving to seat the driver whose hands grasp the arms of the handlebar. The feet of the driver normally rest on footboards secured to the lower end of the frame. Some motorcycles are provided with a rear saddle called a pillion mounted over the rear fender to carry a passenger directly behind the driver.

To afford a more secure support for the seated passenger, the rear saddle in the Honda A.C.E. Tourer illustrated in the June 1997 issue of Motorcycle Cruiser magazine is provided with a fixed backrest. This backrest acts to maintain the passenger in the rear saddle even when forces are generated seeking to propel the passenger rearwardly out of the saddle, as when the motorcycle is quickly accelerated.

Also illustrated in this magazine is a Honda Valkyrie motorcycle in which the driver's saddle and the passenger's saddle are both equipped with a backrest. In the case of the backrest for the driver's saddle, it is angularly adjustable and contoured to conform to the driver's back.

The typical owner of a motorcycle takes pride in its appearance, particularly when the design is streamlined and the fenders are aerodynamically contoured to reduce wind resistance. The smart appearance of a streamlined motorcycle is impaired when the saddle of the vehicle is provided with an upwardly protruding backrest. This has a strictly utilitarian look that is incompatible with the design motif of the vehicle.

A motorcycle is more than just a motorized bicycle for transporting its driver, for the appearance of the motorcycle proclaims the driver's status, just as the appearance of a Rolls Royce auto distinguishes its owner from that of a Ford. In a motorcycle, a smart and elegant appearance is as important to its owner as a first class engine. However, the appearance of a motorcycle must be compatible with its function, and an enhancement in appearance that is at the expense of the proper functioning of the motorcycle is not desirable.

Thus a smartly designed directional signal light unit which is attachable to the handlebar or other part of a motorcycle does not contribute positively to the motorcycle if the unit interferes with the ability of the driver to steer the motorcycle.

A motorcycle in accordance with the invention has integrated into its structure a rumble seat. A conventional rumble seat is an uncovered passenger seat that opens out from the rear of a closed two door automobile in which the driver's seat is within the closed cabin. It has however not heretofore been known to incorporate a rumble seat in the structure of a motorcycle and to do so without impairing the attractive streamlined appearance of this two-wheeled vehicle.

As in an automobile, for reasons of safety it is necessary in a motorcycle not only to provide left and right rear directional signal lights, but to also provide front directional signal lights. By means of such signal lights, drivers in vehicles approaching the rear of the motorcycle as well as those in vehicles approaching the front of the motorcycle are given signals which indicate the direction in which the motorcycle is about to veer.

In a motorcycle, the directional front signal lights are activated by the handlebar whereby when the front wheel is turned by the handlebar to the right, the right signal light is then switched on, and when the front wheel is turned toward the left, then the left signal light is turned on. In many motorcycles these directional signal lights are in the form of accessories which are attached to the handlebar and are provided with cables to connect the signal light to the motorcycle battery.

In the case of the Jardine motorcycle illustrated in the same edition of the Motorcycle Cruiser magazine, the front directional signal lights are formed by compact units joined to the ends of the right and left hollow arms of the handlebar, the cables for these units going through these hollow arms. In the Jardine arrangement, the driver whose gloved hands grasp the arms of the handlebar must be careful not to obscure the signal light units at the extremities of these arms.

SUMMARY OF INVENTION

In view of the foregoing, the main object of this invention is to provide a motorcycle structure having a rumble seat for a passenger which is integrated with the rear fender of the motorcycle whereby when the rumble seat is closed and not in use, it is then fully concealed.

A significant advantage of the invention is that the rumble seat is incorporated in a separated section of an aerodynamically-contoured rear fender whereby when the rumble seat is closed, its outer section then merges with the contours of the fender to maintain the attractive appearance of the fender.

Also an object of this invention is to provide a motorcycle whose handlebar has integrated with each of its arms a directional signal light that also functions to shield the hand of the driver grasping the arm. A significant feature of the invention is that the handle bar serves not only to shield the hands of the driver but to also heat these hands in cold weather.

Briefly stated, these objects are attained by integrating with the structure of a motorcycle whose engine is supported on a frame between a front wheel turnable by a handlebar and a rear wheel guarded by an aerodynamically-contoured rear fender, a rumble seat and directional front signal lights.

The rumble seat which accommodates a passenger is incorporated in a section of the fender behind a saddle for seating a driver whose hands grasp the handlebar. The rumble seat is provided with a hinged backrest having a rear section which when the backrest is folded down over the seat, then merges with the contours of the fender to conceal the seat. The right and left arms of the handlebar each terminate on a hilt having one branch which functions as a heated handle for a hand of the driver and an adjacent second branch which acts to shield the hand and houses a lamp for a directional signal light.

BRIEF DESCRIPTION OF DRAWING

For a better understanding of the invention, as well as further features thereof, reference is made to the detailed description thereof to be read in connection with the annexed drawings wherein.

DESCRIPTION OF INVENTION

Figure 1:
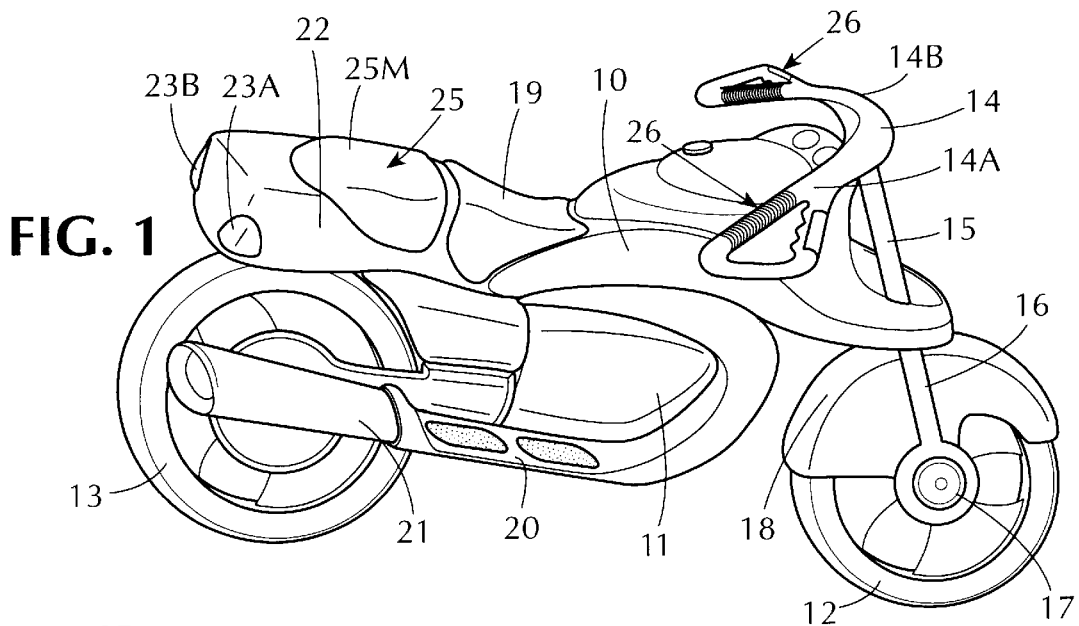
FIG. 1 illustrates a motorcycle in accordance with the invention having incorporated in its structure a rumble seat and directional front signal lights, the rumble seat being shown in its closed state.

Referring now to FIG. 1 there is shown a motorcycle in accordance with the invention having a metal frame 10 for supporting an air-cooled or liquid-cooled internal combustion engine 11 between a front wheel 12 and a rear wheel 13.

Front wheel 12 is steered by a handlebar 14 coupled by a steering post 15 to a fork 16 supporting the axle 17 of the front wheel which is guarded by a front fender 18. The design of motorcycle illustrated in FIG. 1 is by way of example only and a rumble seat and directional lights in accordance with the invention may be incorporated in the structure of any motorcycle having a handlebar and a rear fender regardless of its design.

Mounted on frame 10 above engine 11 is a driver's saddle 19 which is contoured and cushioned to comfortably receive the crotch of the driver. The feet of the driver normally rest on footboards 20 on either side of the motorcycle at the lower end of the frame. Extending rearwardly from footboards 20 are exhaust ducts 21.

Overlying rear wheel 13 is a rear fender 22 formed of metal or composite materials which is also aerodynamically contoured to reduce wind resistance. Incorporated in the structure of the rear fender at the rear end thereof are left and right rear signal lights 23A and 23B.

Figure 2:
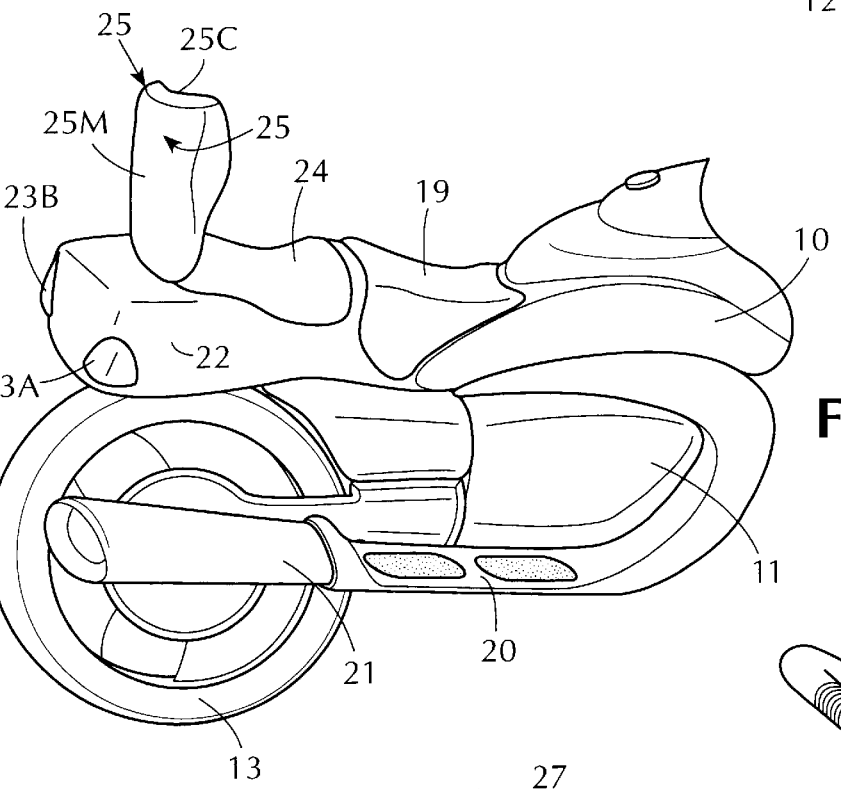
FIG. 2 is the same as FIG. 1 except that the rumble seat is illustrated in its open state.

Incorporated in a separated section of rear fender 22 behind driver's saddle 19 is a rumble seat which, as shown in FIG. 2 is provided with a cushioned seat 24 and a backrest 25 hinged thereto. Backrest 25 is provided with a contoured metal rear section 25M which forms the section of rear fender 22. The inner surface of rear section 25M is lined by a cushion 25C. The contours of the metal or composite rear section 25M of backrest 25, when the backrest is folded down as shown in FIG. 1 to close the rumble seat, then merges with the contours of the rear fender to complete the aerodynamic design of the rear fender.

Hence in the absence of a passenger, with the rumble seat closed, the rumble seat is concealed within the rear fender. The aerodynamic contours of the rear fender are completed by the closed rumble seat so that the appearance of the rear fender is in no way impaired by the rumble seat.

Figure 3:
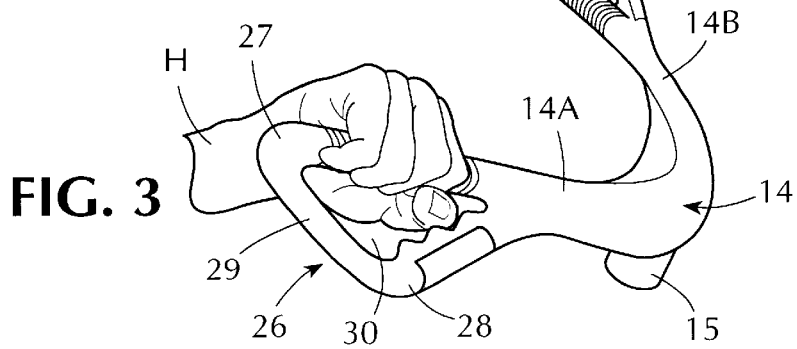
FIG. 3 is a separate view of the directional front signal light on the handlebar.

Handlebar 14 as best seen in FIG. 3 is formed of hollow tubing made of metal or of a composite composition shaped to create left and right arms 14A and 14B, each terminating in a hollow hilt 26. Hilt 26 is defined by a handle branch 27 which is graspable by a hand H of the driver, and a directional light branch 28. These branches are bridged by a cross branch 29 to create an opening 30 to accommodate the fingers of hand H grasping handle branch 27 and a brake lever. Housed within light branch 28 is a signal light or driving light bulb which is connected to the battery of the motorcycle through a cable running through the handlebar. Because the fingers of the hand are within opening 30, light branch 28 acts to shield the hand H grasping handle branch 27.

In practice, a resistance element may be housed in the hollow handle branch 27 to warm the hand grasping this branch, or heat may be supplied to this branch by hot air ducting, the heat being derived from the motorcycle engine. Obviously the heater is turned on only in cold weather.

Figure 4:
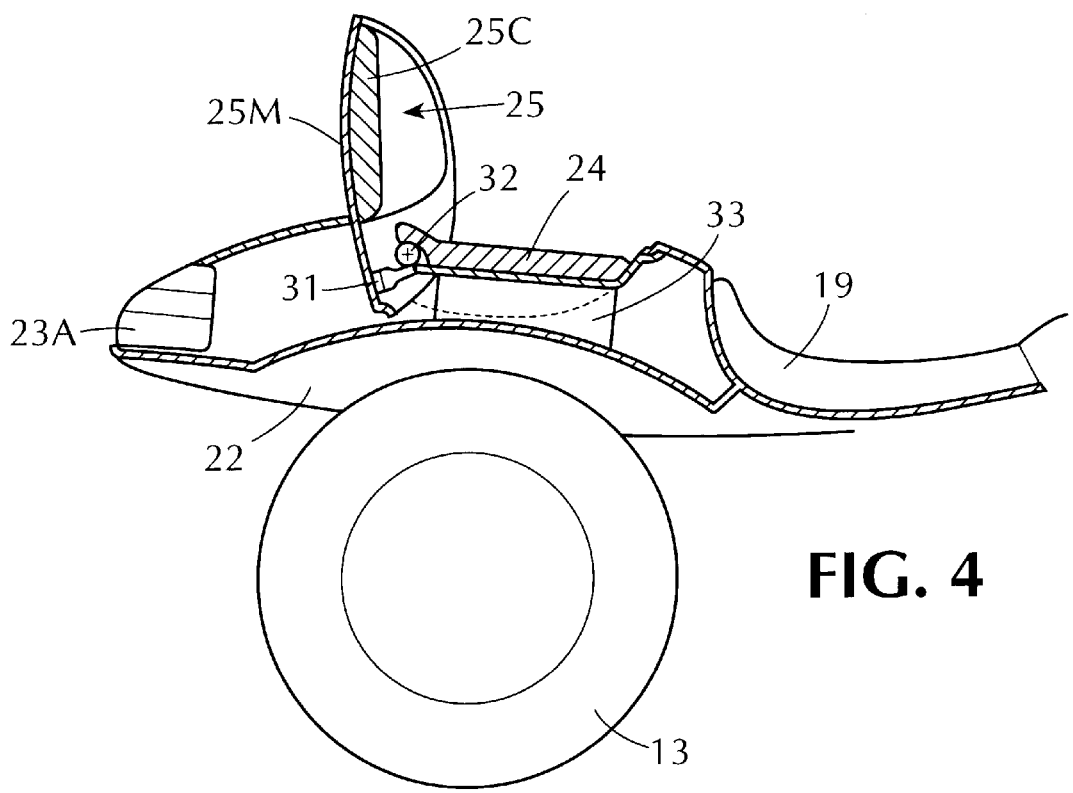
FIG. 4 separately illustrates in a longitudinal section the rumble seat having a back rest hinged thereto, the backrest being raised.
Figure 5:
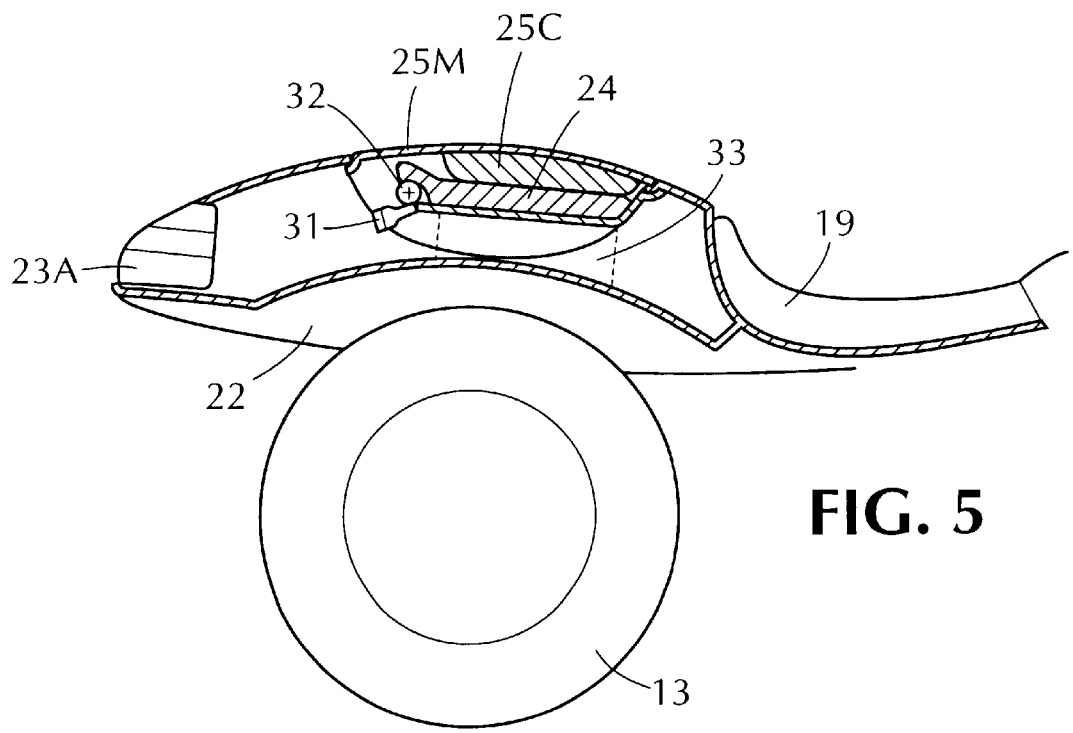
FIG. 5 separately illustrates the rumble seat with the backrest folded down.

Referring now to FIGS. 4 and 5 which illustrate the rumble seat 25 in greater detail, it will be seen that the metal rear section 25M of backrest 25 is hinged to seat 24 by a hinge 31 whose leaf is attached to rear section 25M, the leaf being coupled to seat 24 by a pivot pin 32. The hinge arrangement is such that when the rumble seat is open, the swung-open backrest 25 then has its cushion 25C erect and raised above seat 24, as shown in FIG. 4. Seat 24 is nested within the rear fender and supported on a pedestal 33 therein.

But when the backrest is folded down on seat 24, the backrest cushion section 24C then overlies the cushioned seat 24, and the backrest rear section 25M completes the contoured rear fender, the curvature of metal or composite material rear section 25M merging with the contours of the rear fender.

While there has been shown and described a preferred embodiment of a motorcycle structure incorporating a rumble seat and directional signal lights in accordance with the invention, it will be appreciated that many changes and modifications may be made therein without, however, departing from the essential spirit thereof.

I claim:

1. A rumble seat integrated with a motorcycle structure in which an engine is supported on a frame between a front wheel and a rear wheel, the rear wheel being guarded by an aerodynamically-contoured rear fender contoured to reduce wind resistance, a saddle to accommodate a driver being mounted on the frame above the engine, the rumble seat comprising:

A. a seat for accommodating a passenger, the seat being nested within the rear fender; and B. a backrest hinged to the seat to support the back of a seated passenger, said backrest having a contoured rear section that constitutes a cutout section of the contoured fender whereby when the hinged backrest is folded down over the seat to conceal the seat, the contoured rear section of the backrest then merges with and completes the aerodynamically contoured fender, and when the backrest is folded up, the rear section is then extended above the seat, the integration of the rumble seat with the motorcycle structure being such that when the backrest is folded down and the rumble seat is closed, it is then effectively invisible.

2. A rumble seat as set forth in claim 1, in which the backrest includes a cushion section lining the rear section.

3. A rumble seat as set forth in claim 2, in which the backrest is hinged to said seat by a hinge having a leaf joined to said rear section, said leaf being coupled to the seat by a pivot pin.

4. A rumble seat as set forth in claim 3, in which said seat is cushioned and which when the rumble seat is closed, the cushion section of the backrest overlies the cushioned seat.

5. A rumble seat as set forth in claim 1, in which the rear fender is aerodynamically contoured to reduce wind resistance and is provided at its rear with left and right signal lights.

\* \* \* \* \*